United States Patent
Rydberg et al.

(10) Patent No.: US 11,359,666 B2
(45) Date of Patent: Jun. 14, 2022

(54) BEARING SYSTEM, ROLL ASSEMBLY, AND METAL COATING LINE ASSEMBLY INCLUDING SAME

(71) Applicant: ATLAS MACHINE AND SUPPLY, INC., Louisville, KY (US)

(72) Inventors: Jeremy Rydberg, Louisville, KY (US); Michael Almli, Louisville, KY (US)

(73) Assignee: ATLAS MACHINE AND SUPPLY, INC., Louisville, KY (US)

( * ) Notice: Subject to any disclaimer, the term of this patent is extended or adjusted under 35 U.S.C. 154(b) by 33 days.

(21) Appl. No.: 16/619,592

(22) PCT Filed: Jun. 6, 2018

(86) PCT No.: PCT/US2018/036270
§ 371 (c)(1),
(2) Date: Dec. 5, 2019

(87) PCT Pub. No.: WO2018/226840
PCT Pub. Date: Dec. 13, 2018

(65) Prior Publication Data
US 2020/0132114 A1  Apr. 30, 2020

Related U.S. Application Data

(60) Provisional application No. 62/515,646, filed on Jun. 6, 2017.

(51) Int. Cl.
*F16C 13/06* (2006.01)
*F16C 33/72* (2006.01)
(Continued)

(52) U.S. Cl.
CPC ........... *F16C 13/06* (2013.01); *B05C 3/02* (2013.01); *C23C 2/003* (2013.01); *C23C 2/06* (2013.01);
(Continued)

(58) Field of Classification Search
CPC ........ F16C 13/02; F16C 13/06; F16C 33/723; F16C 33/7886; F16C 35/042;
(Continued)

(56) References Cited

U.S. PATENT DOCUMENTS 4,840,385 A * 6/1989 Senft .................. F16C 13/02
                                                   277/420
5,954,880 A * 9/1999 Aoki .................. F16C 35/077
                                                   118/423
(Continued)

FOREIGN PATENT DOCUMENTS

CN          2915881 Y      6/2007
JP          H0436449 A     2/1992
(Continued)

OTHER PUBLICATIONS

Machine Translation of CN 2915881 (Year: 2007).*
(Continued)

*Primary Examiner* — Alan B Waits
(74) *Attorney, Agent, or Firm* — James R. Hayne, Esq.; Stites & Harbison PLLC

(57) ABSTRACT

A bearing system that accepts a journal of a roll includes a housing defining a cavity and having a forward wall that defines an opening into the cavity, the opening configured to accept the journal through the opening and into the cavity. A sleeve is positioned within the cavity of the housing, the sleeve configured to surround the end of the journal. A first seal is positioned within the cavity of the housing adjacent to the forward wall of the housing, the first seal having an engagement surface. A second seal is positioned within the cavity of the housing and operably connected to the sleeve, the second seal having an engagement surface in contact with the engagement surface of the first seal.

15 Claims, 5 Drawing Sheets

(51) Int. Cl.
  *F16C 35/04* (2006.01)
  *C23C 2/00* (2006.01)
  *C23C 2/06* (2006.01)
  *B05C 3/02* (2006.01)

(52) U.S. Cl.
  CPC .......... *F16C 33/723* (2013.01); *F16C 35/042* (2013.01); *F16C 2326/58* (2013.01)

(58) Field of Classification Search
  CPC .... F16C 35/073; F16C 2326/58; C23C 2/003; C23C 2/06; B05C 3/02
  See application file for complete search history.

(56) References Cited

U.S. PATENT DOCUMENTS

| | | | |
|---|---|---|---|
| 6,554,904 | B1 | 4/2003 | Gimpel et al. |
| 2002/0164101 | A1* | 11/2002 | Bass .................. A01F 15/18 384/537 |
| 2005/0223976 | A1* | 10/2005 | Platzer .................. F16C 13/02 118/419 |
| 2008/0244886 | A1* | 10/2008 | Martins ................ B21B 31/074 29/252 |
| 2009/0028478 | A1 | 1/2009 | Kim et al. |
| 2010/0051451 | A1 | 3/2010 | Sato |

FOREIGN PATENT DOCUMENTS

| | | |
|---|---|---|
| JP | H04258521 A | 9/1992 |
| KR | 100838737 B1 | 6/2008 |

OTHER PUBLICATIONS

Machine Translation of JP H04-36449 (Year: 1992).*
Machine Translation of JP H04258521 (Year: 1992).*
Machine Translation of KR 100806594 (Year: 2008).*
Machine Translation of KR100838737 (Year: 2008).*
International Preliminary Report on Patentability, International Application No. PCT/US2018/036270, dated Dec. 10, 2019, 13 page.
U.S. Search Report for Application No. PCT/US2018/036270, dated Aug. 31, 2018, ISA/US Commissioner for Patents.
Written Opinion for Application No. PCT/US2018/036270, dated Aug. 31, 2018, ISA/US Commissioner for Patents.
Improved Materials and Design of Pot Roll Bearings (Atlas Machine and Supply); file dated Oct. 5, 2017, retrieved from https://s3.amazonaws.com/atlasmachine/documents/Papers+-+Improved+Materials+and+Design+of+Pot+Roll+Bearings.pdf, retrieved on Aug. 14, 2018; all pages.

* cited by examiner

BEARING SYSTEM, ROLL ASSEMBLY, AND METAL COATING LINE ASSEMBLY INCLUDING SAME

CROSS-REFERENCE TO RELATED APPLICATIONS

The present application claims priority to U.S. Provisional Patent Application Ser. No. 62/515,646 filed on Jun. 6, 2017, the entire disclosure of which are incorporated herein by reference.

TECHNICAL FIELD

The present invention relates to bearing systems for use with a roll assembly configured to be submerged in a corrosive environment, such as molten metal as part of a galvanizing line assembly. More specifically, the present invention relates to a bearing system that includes internal seals and a pressurized cavity which removably accepts the journal of a roll.

BACKGROUND OF THE INVENTION

The present invention relates generally to a metal coating line assembly, such as a galvanizing line assembly. A typical metal coating line assembly is used to plate a metal layer (e.g. zinc) on a steel sheet by submerging the steel sheet in a hot dipping bath of the molten plating metal.

FIG. 5 illustrates a typical zinc pot in a continuous galvanizing line 100. As shown in FIG. 5, a steel sheet 101 is continuously supplied and submerged into molten zinc 103 contained within a zinc pot 102. As shown, the steel sheet 101 is turned upward by one or more roll assemblies 104 before exiting the molten zinc 103. The coated steel sheet is cold solidified and wound into a coil through a tension reel (not illustrated).

As shown in FIG. 5, the roll assemblies 104 are immersed in the zinc pot 102 filled with hot molten zinc 103 having a temperature of about 450° C. to 460° C. This is a highly corrosive environment, and, as such, it is typical that a simple plain bearing is used at the ends of each of the rolls as other bearing types are not well suited for the highly corrosive environment of a zinc pot. The plain bearings used in the typical zinc pot are made from a variety of wear resistant materials, but nevertheless, the bearings used with these roll systems have a short operational life. Furthermore, plain bearings have extremely high rotational friction loads, and in order to prevent sheet slippage, designers have reduced journal diameter. As a result, these narrow journals frequently break off during service. Further still, plain bearings create chatter and vibration which leads to inconsistent coating quality and thickness.

SUMMARY OF THE INVENTION

The present invention relates to bearing systems for use with a roll assembly configured to be submerged in a corrosive environment, such as molten metal as part of a galvanizing line assembly.

With respect to the bearing assemblies in particular, one exemplary bearing assembly, or bearing system, of the present invention includes a housing that defines a cavity which accepts the journal of a roll. More specifically, the housing includes a forward wall that defines an opening into the cavity and the opening in the forward wall is configured to accept the journal through the opening. The housing further defines a rear end opening away from the forward wall. A cover plate is removably positioned over the rear end opening to selectively provide access to the cavity.

The exemplary bearing system further includes a sleeve positioned within the cavity of the housing and which is configured to surround the end of the journal. In some embodiments of the present invention, the sleeve is comprised of a material having a coefficient of thermal expansion which is less than the coefficient of thermal expansion of the journal. Accordingly, as the journal is heated, the journal will expand more than the sleeve, thus locking the sleeve onto the journal. When the journal cools and shrinks the sleeve will release from the journal. In this way, the exemplary sleeve is removably secured to the journal through a self-locking mechanism. Accordingly, the roll can be readily changed without requiring disassembly of the entire bearing system simply by removing the roll from the molten zinc and allowing the roll to cool until the sleeve releases from the journal. The journal can then slide out of the opening in the forward wall of the housing and the journal of a replacement roll can then be similarly installed.

The exemplary bearing system further includes a first seal positioned within the cavity of the housing adjacent to the forward wall of the housing so as to completely surround the opening in the forward wall of the housing. The first seal includes a rear engagement surface which, in some embodiments, is sloped towards the forward wall of the housing. A second seal is also positioned within the cavity of the housing and operably connected to the sleeve. In particular, the second seal defines a substantially cylindrical through hole with an internal surface which is positioned around and operably connected to the sleeve. The second seal is configured to be inserted through the first seal such that a substantially cylindrical exterior engagement surface of the second seal is in contact with the internal engagement surface of the first seal and a sloped forward engagement surface of the second is in contact with the sloped rear engagement surface of the first seal. Similar to the sloped rear engagement surface of the first seal, the forward engagement surface of the second seal is sloped towards the forward wall of the housing. In some exemplary bearing systems of the present invention, the second seal not only extends through the first seal but also through the opening in the forward wall of the housing to directly contact the roll around the journal.

In some embodiments of the present invention, a bearing is also positioned within the cavity of the housing to facilitate rotation of the roll and the sleeve.

In some exemplary bearing systems of the present invention, the cavity of the housing is pressurized by a gas line which is in fluid communication with the cavity. The gas line supplies gas into the cavity at sufficient pressure to push the second seal against the first seal to maintain the seal. Furthermore, in the event that a momentary thrust load from the roll temporarily breaks the contact of the seals, it is contemplated that the positive pressure within the cavity is sufficient to force gas out of the cavity with enough pressure to prevent the molten metal from entering the cavity.

Some exemplary bearing systems of the present invention further include a spring within the cavity of the housing positioned between the bearing and the cover plate. The spring bias the second seal forward such that the seals are in contact. Advantageously, the spring is capable of providing enough force to maintain the necessary contact between the seals even when the cavity is not pressurized.

In addition to accommodating rotation of the roll around its longitudinal axis, some exemplary bearing systems of the present invention further allow for rotation of the roll in a direction perpendicular to the longitudinal axis of the roll. In some embodiments, an arm is connected to an exterior housing which partially encloses the housing of the bearing system to form a ball joint which allows the housing to rotate relative to the exterior housing perpendicular to the longitudinal axis of the roll. In particular, the exterior housing has a curved inner surface and the housing includes a curved exterior surface configured to engage the curved inner surface of the exterior housing.

The bearing system of the present invention prevents molten metal from entering the cavity of the housing. The bearing system, and in particular the bearing itself, will therefore experience significantly less wear, extending the operational life of the bearing system of the present invention. As such, it is contemplated that, in some embodiments, the roll used in conjunction with the bearing system of the present invention includes a coating along the exterior surface of the main body which further increases the operational life of the roll by improving at least one of wear resistance, hardness, thermal stability, resistance to corrosion by acids, and/or reduced coefficient of friction. Of course, other coatings or treatments are also contemplated to extend the operational life of the bearing system and/or roll in order to reduce the frequency of equipment changes which reduces the time in which the galvanizing line assembly is not operational.

In some embodiments of the present invention, the bearing system described above is used for each of two bearing assemblies connected to either side of a roll as part of a roll assembly. The roll assembly of the present invention is configured to be submerged in a corrosive environment, such as molten metal. As such, the roll assembly can be used, for example, in a metal coating line assembly, such as a galvanizing line assembly. It is contemplated that the present invention is also suitable for other metal coating system including, but not limited to, assemblies for the production of galvannealed steel, galvalum, and aluminized metals. Likewise, any application in which a bearing system is subjected to a corrosive environment would benefit from the bearing system of the present invention.

DESCRIPTION OF THE INVENTION

The present invention is a bearing system for use with a roll assembly configured to be submerged in a corrosive environment, such as molten metal as part of a galvanizing line assembly.

Figure 1:
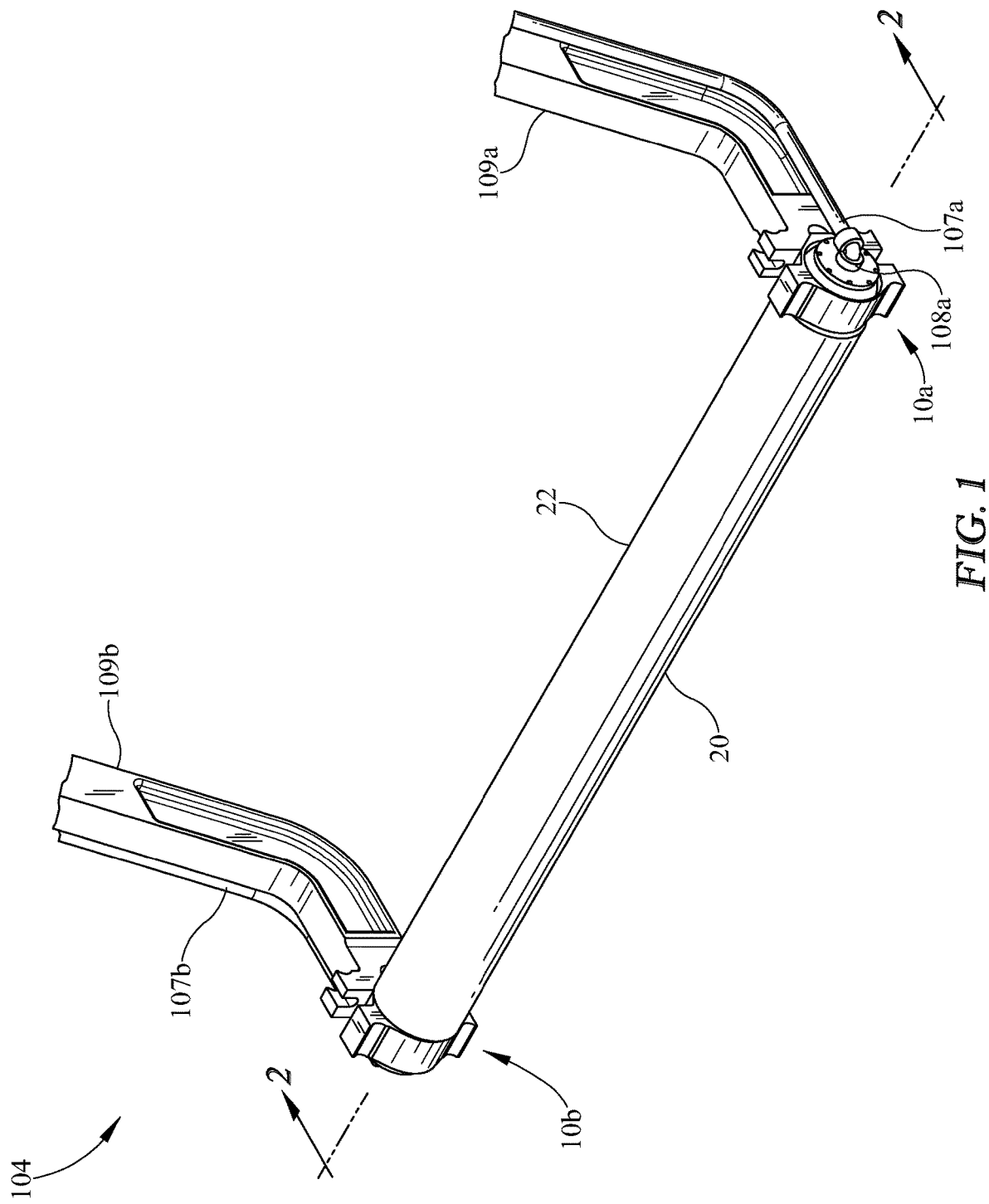
FIG. 1 is a perspective view of a roll assembly made in accordance with the present invention.

Referring first to FIG. 1, similar to previous galvanizing lines, in one exemplary embodiment of the present invention, a roll assembly 104 includes a roll 20 that is supported on either end by arm 109a, 109b. The roll 20 is typical in the art in that it includes a substantially cylindrical main body 22 with two journals (one journal 26 shown in FIGS. 2-3) extending from either end of the main body 22 along the longitudinal axis of the main body 22. However, unlike in previously known galvanizing lines, instead of utilizing plain bearings, the roll assembly 104 includes bearing assemblies 10a, 10b which are configured to accept the journal 26 of the roll 20. Additional features of the roll 20, the arms 109a, 109b, and roll assembly 104 in general will be described in further detailed below.

Figure 2:
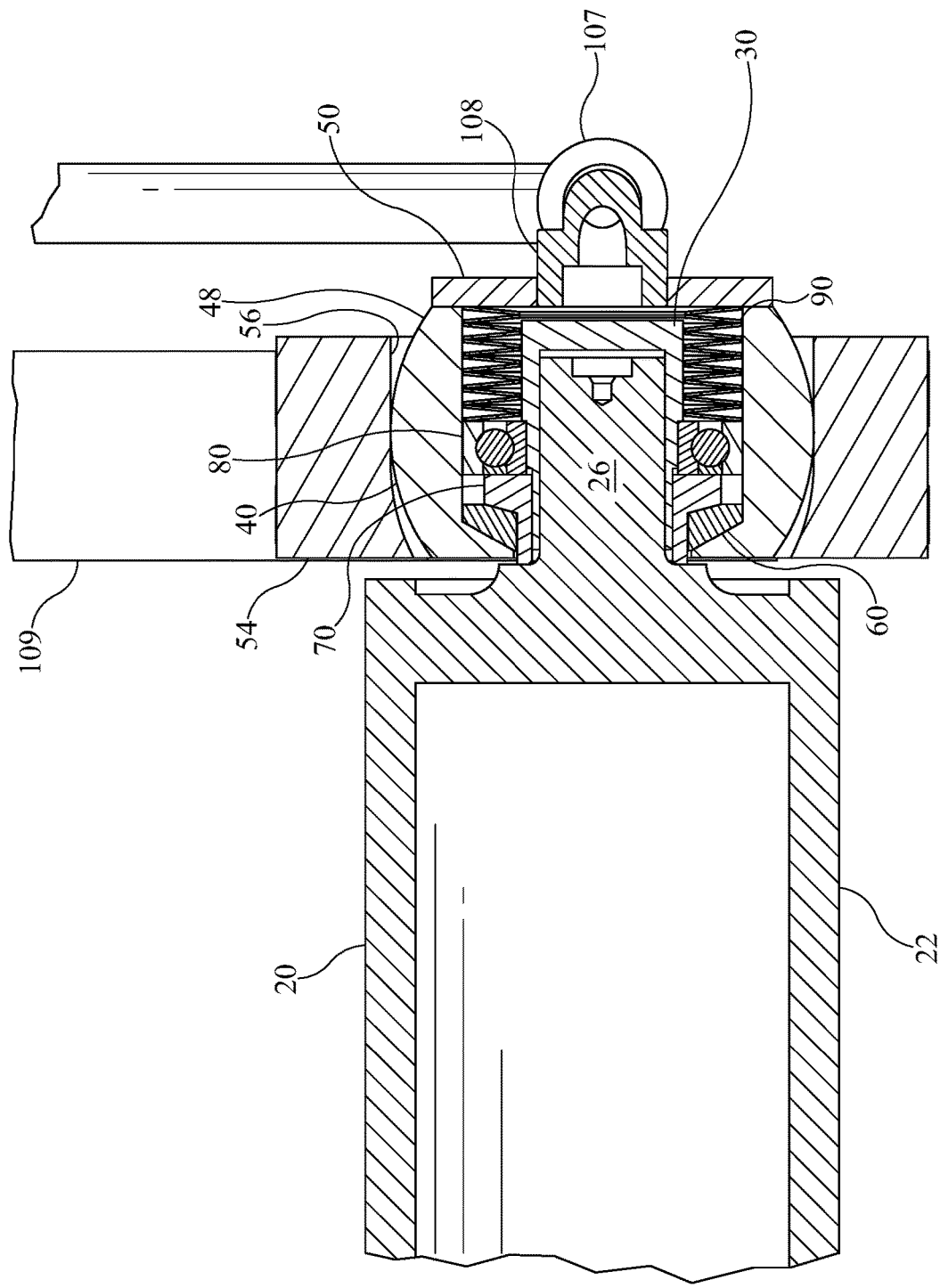
FIG. 2 is a cross-sectional view of a bearing system of the present invention taken along line 2-2 in FIG. 1.
Figure 3:
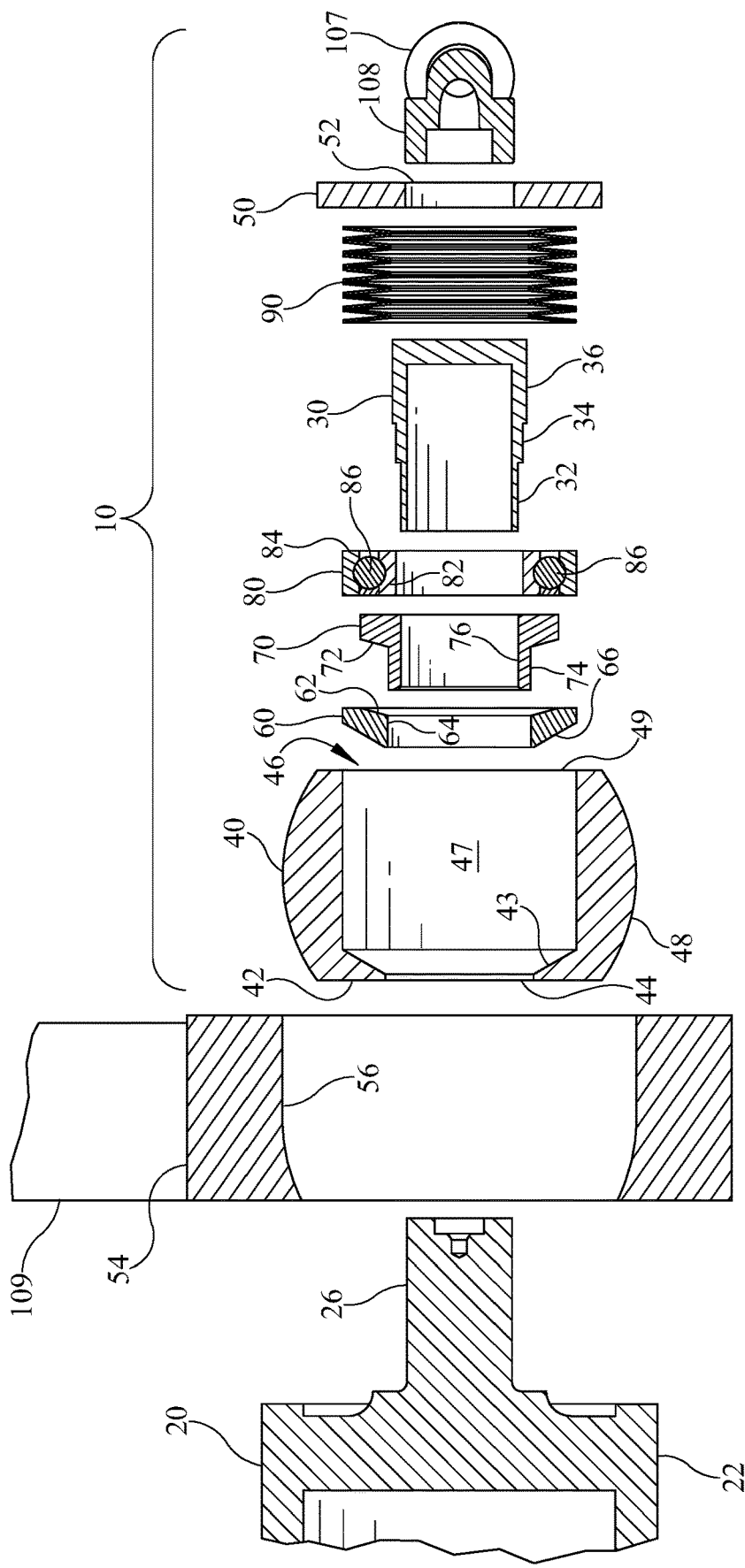
FIG. 3 is an exploded view of the bearing system of FIG. 2.

With respect to the bearing assemblies 10a, 10b in particular, and turning now to FIGS. 2-3, one exemplary bearing assembly 10, or bearing system 10, of the present invention representative of the bearing assemblies 10a, 10b shown in FIG. 1 includes a housing 40 that defines a cavity 46 which accepts the journal 26 of the roll 20. More specifically, the housing 40 includes a forward wall 42 that defines an opening 44 into the cavity 46 and the opening 44 in the forward wall 42 is configured to accept the journal 26 through the opening 44. The housing 40 further defines a rear end opening 49 away from the forward wall 42. A cover plate 50 is removably positioned over the rear end opening 49 to selectively provide access to the cavity 46 while also preventing molten metal from entering the cavity 46 through the rear end opening 49 when the housing 40 is submerged. As perhaps best shown in FIG. 3, an internal surface 47 of the housing 40 extends between the forward wall 42 and the rear end opening 49 with the internal surface 47 being substantially cylindrical. An interior surface 43 of the forward wall 42 of the housing 40 is angled relative to the internal surface 47 of the housing 40 such that the forward wall 42 narrows in the direction of the opening 44, as further discussed below.

The exemplary bearing system 10 further includes a sleeve 30 positioned within the cavity 46 of the housing 40 and which is configured to surround the end of the journal 26. As discussed in further detail below, the sleeve 30 has a forward exterior surface 32, an intermediate exterior surface 34, and a rear exterior surface 36 with each increasing in diameter.

In some embodiments of the present invention, the sleeve 30 is comprised of a material having a coefficient of thermal expansion which is less than the coefficient of thermal expansion of the journal 26. Accordingly, as the journal 26 is heated, for example from submerging the roll 20 into molten metal, the journal 26 will expand more than the sleeve 30, thus locking the sleeve 30 onto the journal 26. When the journal 26 cools and shrinks, the sleeve 30 will release from the journal 26. In this way, the exemplary sleeve 30 is removably secured to the journal 26 through a self-locking mechanism. Accordingly, the roll 20 can be readily changed without requiring disassembly of the entire bearing system 10 simply by removing the roll 20 from the molten metal and allowing the roll 20 to cool until the sleeve 30 releases from the journal 26. The journal 26 can then slide out of the opening 44 in the forward wall 42 of the housing 40 and the journal of a replacement roll can then be similarly installed.

Of course, it is contemplated that in other embodiments, the sleeve 30 can be removably secured to the journal 26 by other means without departing from the spirit and scope of the present invention. For example, one or more screws (not shown) can be inserted through the end of the sleeve 30 and into the end of the journal 26 by way of the rear end opening 49 of the housing 40. In such an embodiment, the roll 20 can still be readily changed without requiring disassembly of the entire bearing system 10 by removing the cover plate 50 and mechanically releasing the sleeve 30 from the journal 26. Referring still to FIGS. 2-3, the exemplary bearing system 10 further includes a first seal 60 positioned within the cavity 46 of the housing 40 adjacent to the forward wall 42 of the housing 40 so as to completely surround the opening 44 in the forward wall 42 of the housing 40. In particular, the first seal 60 defines a substantially cylindrical through hole with an internal engagement surface 64 which is substantially the same size as the opening 44 in the forward wall 42 of the housing 40. According to some exemplary embodiments of the present invention, the first seal 60 is press fit in place within the cavity 46. As such, the first seal 60 has a sloped forward surface 66 which is positioned immediately next to the interior surface 43 of the forward wall 42. The first seal 60 also includes a rear engagement surface 62 which is sloped towards the forward wall 42 of the housing 40, as described further below. It is contemplated, however, that in some other embodiments the first seal 60 can be removably secured to forward wall 42 of the housing 40 by other means without departing from the spirit and scope of the present invention. For example, a first seal formed in substantially the same shape as the first seal 60 shown in FIGS. 2-3 can be inserted into the housing 40 by way of the rear end opening 49 of the housing 40 and then one or more screws can be used to secure the first seal 60 to the forward wall 42 of the housing 40 by way of the rear end opening 49 of the housing 40. Likewise, it is contemplated that an anti-rotation pin or screw (not shown) can further be included so as to extend through the first seal 60 and into the forward wall 42 of the housing 40 to ensure that the first seal 60 does not rotate relative to the forward wall 42 of the housing 40.

Referring still to FIGS. 2-3, a second seal 70 is also positioned within the cavity 46 of the housing 40, but the second seal 70 is operably connected to the sleeve 30. In particular, as shown in FIG. 3, the second seal 70 defines a substantially cylindrical through hole with an internal surface 76 which is positioned around and operably connected to the forward exterior surface 32 of the sleeve 30, as discussed further below.

The second seal 70 is configured to be inserted through the first seal 60 such that a substantially cylindrical exterior engagement surface 74 of the second seal 70 is in contact with the internal engagement surface 64 of the first seal 60 forming a substantially tight fit between the exterior engagement surface 74 of the second seal 70 and the internal engagement surface 64 of the first seal 60, the features and advantages of which are discussed further below. Furthermore, a sloped forward engagement surface 72 of the second seal 70 is in contact with the sloped rear engagement surface 62 of the first seal 60. Similar to the sloped rear engagement surface 62 of the first seal 60, the forward engagement surface 72 of the second seal 70 is sloped towards the forward wall 42 of the housing 40.

Referring now specifically to FIG. 2, in the exemplary bearing system 10, the second seal 70 not only extends through the first seal 60 but also through the opening 44 in the forward wall 42 of the housing 40 to directly contact the roll 20 around the journal 26. As such, the second seal 70 provides a seal around the journal 26 of the roll and thus prevents molten metal from entering between the journal 26 and the sleeve 30.

Referring once again to FIGS. 2-3, to facilitate rotation of the roll 20 and the sleeve 30, the bearing system 10 further includes a bearing 80 positioned within the cavity 46 of the housing 40. Specifically, the exemplary bearing 80 includes an inner race 82 positioned around and operably connected to the intermediate exterior surface 34 of the sleeve 30, an outer race 84 positioned adjacent to the interior surface 47 of the housing 40, and a plurality of balls 86 positioned between the inner race 82 and the outer race 84. As such, the bearing 80 shown in this exemplary embodiment is a typical rolling bearing. It is contemplated that the bearing 80 included in the exemplary bearing system 10 of the present invention reduces strip vibrations during coating which decreases the amount of zinc applied to the steel sheet and increases the quality and value of the coated steel. In some exemplary embodiments, the bearing 80, or at least some component parts, is comprised of heat resistant steel, hybrid steel and ceramic, or full ceramic. Of course, it is contemplated that other bearings known in the art can be used as part of the bearing system 10 of the present invention without departing from the spirit and scope of the present invention.

Referring once again to FIG. 3, as previously mentioned, the first seal 60 and the second seal 70 are configured to maintain a seal between the two engagement surfaces 62, 72. As such, when the bearing system 10 is submerged in the bath of molten metal, the molten metal cannot enter the cavity 46 of the housing 40. To this end, the exemplary bearing system 10 of the present invention includes multiple features to ensure proper contact is maintained between the two engagement surfaces 62, 72 of the seals 60, 70.

Referring now to FIGS. 1-4, in the exemplary bearing system 10 of the present invention, the cavity 46 of the housing 40 is pressurized by a gas line 107 which is in fluid communication with the cavity 46. In particular, the gas line 107 is connected to the housing 40 by a fitting 108 which extends through an opening 52 defined in the cover plate 50 at the rear of the housing 40. The configuration of the gas line 107 and fitting 108 is not particularly limited, but it is contemplated that, in at least some embodiments, the connection of the gas line 107 and fitting 108 to the housing 40 prevents unwanted rotation of the housing 40. Regardless, as perhaps best shown in FIG. 4 in particular, the exemplary gas line 107 runs substantially parallel, but independent of, the arm 109, as discussed further below.

The gas line 107 supplies gas into the cavity 46 at sufficient pressure to push the second seal 70 against the first seal 60 and provide the necessary contact between the engagement surfaces 62, 72 of the seals 60, 70 to maintain the seal between the two engagement surfaces 62, 72. Furthermore, in the event that a momentary thrust load from the roll 20 temporarily breaks the contact of the seals 60, 70, it is contemplated that the positive pressure within the cavity 46 is sufficient to force gas out of the cavity 46 with enough pressure to prevent the molten metal from entering the cavity 46. For example, in some embodiments, the pressure within the cavity 46 is maintained in a range of about 25 psi to about 50 psi. However, it is contemplated that the bearing system 10 of the present invention is operable with pressures as low as about 5 psi maintained within the cavity 46 and with pressures as high as about 300 psi maintained within the cavity 46. Of course, the particular pressure within the cavity will vary depending on the intended application of the bearing system of the present invention. Regardless of the particular pressure supplied by the gas line 107, it is preferable that an inert gas, for example nitrogen, is used with the bearing system 10 of the present invention.

Referring once again to FIGS. 2-3 in particular, the exemplary bearing system 10 further includes a spring 90 within the cavity 46 of the housing 40 positioned between the bearing 80 and the cover plate 50. The spring 90 bias the second seal 80 forward such that the engagement surfaces 62, 72 of the seals 60, 70 are in contact. Advantageously, the spring 90 is capable of providing enough force to maintain the necessary contact between the engagement surfaces 62, 72 of the seals 60, 70 to maintain the seal between the two engagement surfaces 62, 72, even when the cavity 46 is not pressurized. In the exemplary embodiment shown in FIGS. 2-3, the spring 90 is formed from a plurality of Belleville washers which surround a rear exterior surface 36 of the sleeve 30, but other springs can be used without departing from the spirit and scope of the present invention. Preferably, the spring 90 is configured to only contact the outer race 84 of the bearing 80 such that the sleeve 30 and inner race 82 of the bearing 80 can freely rotate. Having now described each of the primary components of the bearing system 10 of the present invention, and referring still to FIGS. 2-3, in operation, once the roll 20 and bearing system 10 are heated such that the sleeve 30 is secured to the journal 26 of the roll 20, as the roll 20 rotates around its longitudinal axis, the sleeve 30 will rotate along with the roll 20. Due to the connection of the internal surface 76 of the second seal 70 to the forward exterior surface 32 of the sleeve 30, the second seal 70 will also rotate along with the roll 20. Likewise, due to the connection of the inner race 82 of the bearing 80 to the intermediate exterior surface 34 of the sleeve 30, the inner race 82 of the bearing 80 will also rotate along with the roll 20. In contrast, the first seal 60 and outer race 84 of the bearing 80 will remain stationary within the housing 40. As such, the first seal 60 and the second seal 70 will rub against one another as the roll 20 rotates. The bearing system 10 therefore includes several features which allow the journal 26 of the roll 20, and the attached sleeve 30, to rotate relative to the housing 40 around the axis of the roll 20 while maintaining a seal.

As previously discussed, the exterior engagement surface 74 of the second seal 70 is in contact with the internal engagement surface 64 of the first seal 60 forming a substantially tight fit between the exterior engagement surface 74 of the second seal 70 and the internal engagement surface 64 of the first seal 60. In some embodiments of the present invention, the first seal 60 and the second seal 70 are comprised of non-wetting materials, such that the substantially tight fit between the exterior engagement surface 74 of the second seal 70 and the internal engagement surface 64 of the first seal 60 naturally rejects molten metal by the meniscus effect of liquids on non-wetting surfaces. Furthermore, providing such a small clearance will increase the velocity of gas escaping in the event that momentary thrust load from the roll 20 temporarily breaks the contact of the seals 60, 70. This high velocity gas will more readily prevent the molten metal from entering the cavity 46 and maintain air pressure in the cavity.

As previously discussed, the rear engagement surface 62 of the first seal 60 and the forward engagement surface 72 of the second seal 70 are similarly sloped towards the forward wall 42 of the housing 40. As the first and second seals 60, 70 wear down, these corresponding sloped surfaces provide for automatic adjustment of the seals 60, 70 to maintain the seal between the two engagement surfaces 62, 72 of the seals 60, 70. The particular slope of the rear engagement surface 62 of the first seal 60 and the forward engagement surface 72 of the second seal 70 is not limited and, in some embodiments, there can be no slope at all. In embodiment where the engagement surfaces 62, 72 are flat, e.g., perpendicular to the longitudinal axis of the roll 20, radial loading is maintained entirely on the bearing 80. By comparison, when the engagement surfaces 62, 72 are sloped, radial loading is shared between the bearing 80 and the seals 70, 80. The particular angle of the slope will affect how the radial load is balanced between the bearing 80 and the seals 60, 70, and therefore will vary depending on the intended application of the bearing system of the present invention. It is contemplated, however, that the lowest preferred angle is about 7°.

Regardless of the automatic adjustment of the seals 60, 70, the exemplary seals 60, 70 are preferably comprised of a resilient material, such as a ceramic, carbide, or other similar carbonic material, which is preferably resistant to mechanical, chemical, and/or thermal deterioration. For example, in some exemplary embodiments, the first seal 60, the second seal 70, or the first seal 60 and the second seal 70 are comprised of a ceramic including, but not limited, to one or more of the follow: carbon, carbon-carbon, tungsten carbide, M50 steel, zirconia, silicon nitride, silicon carbide, 440C stainless steel, 52100 steel, stellite, sialon, cobalt alloys and the like.

As previously mentioned, the internal surface 47 of the forward wall 42 of the housing 40 is sloped and the forward surface 66 of the first seal 60 is similarly sloped. It is contemplated that in the event of that any one of the housing 40, the first seal 60, or the second seal 70 have varying coefficients of thermal expansion, upon heating the bearing system 10, the resulting differential expansion is automatically adjusted for by each of these pairs of corresponding sloped surfaces (e.g., the rear engagement surface 62 of the first seal 60 and the forward engagement surface 72 of the second seal 70; and the internal surface 47 of the forward wall 42 of the housing 40 and the forward surface 66 of the first seal 60). Once again, this advantageously maintains the seal between the two engagement surfaces 62, 72 of the seals 60, 70.

Figure 4:
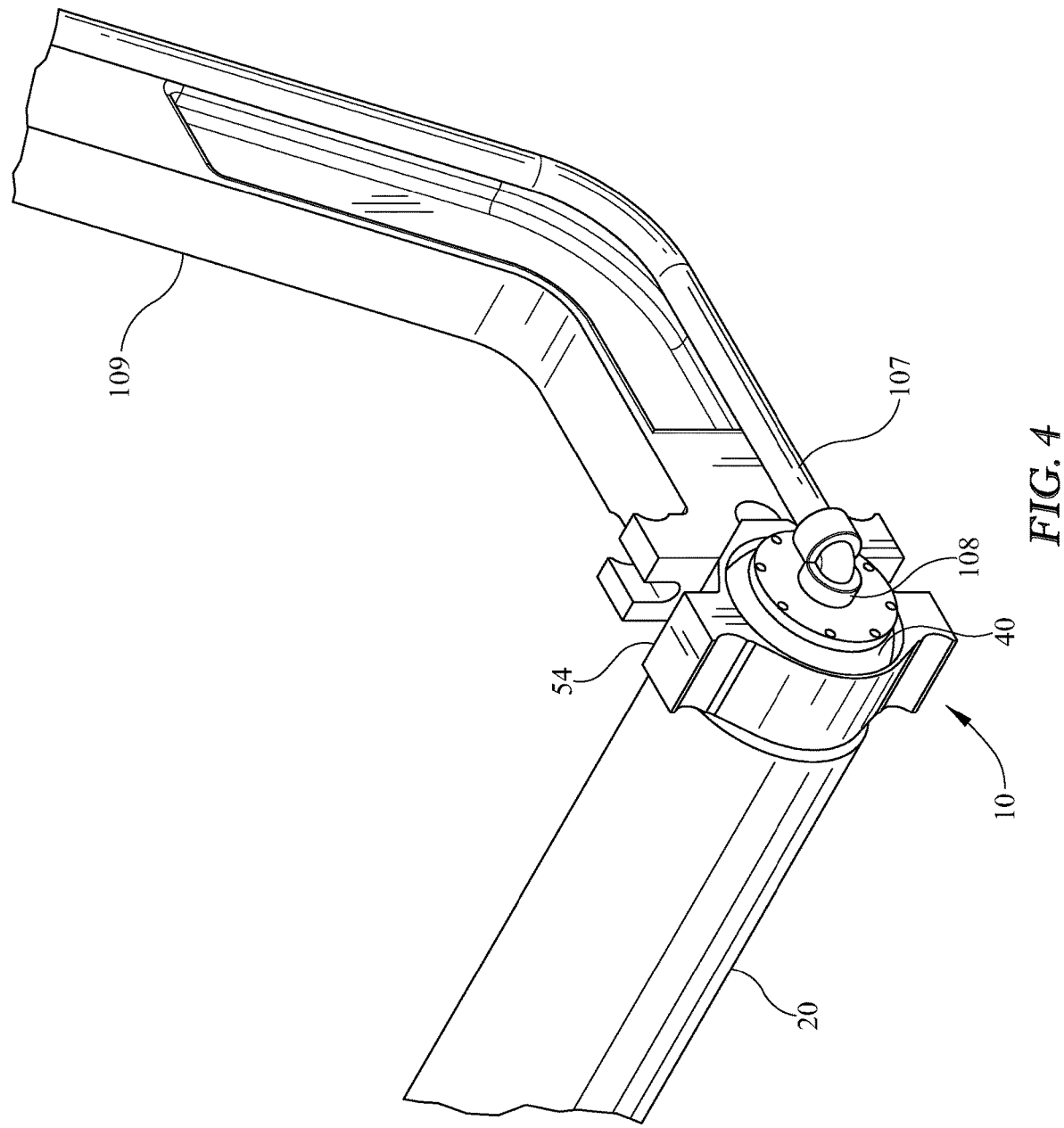
FIG. 4 is a detailed view of the bearing system of FIG. 2 connected to an arm and a gas line.
Figure 5:
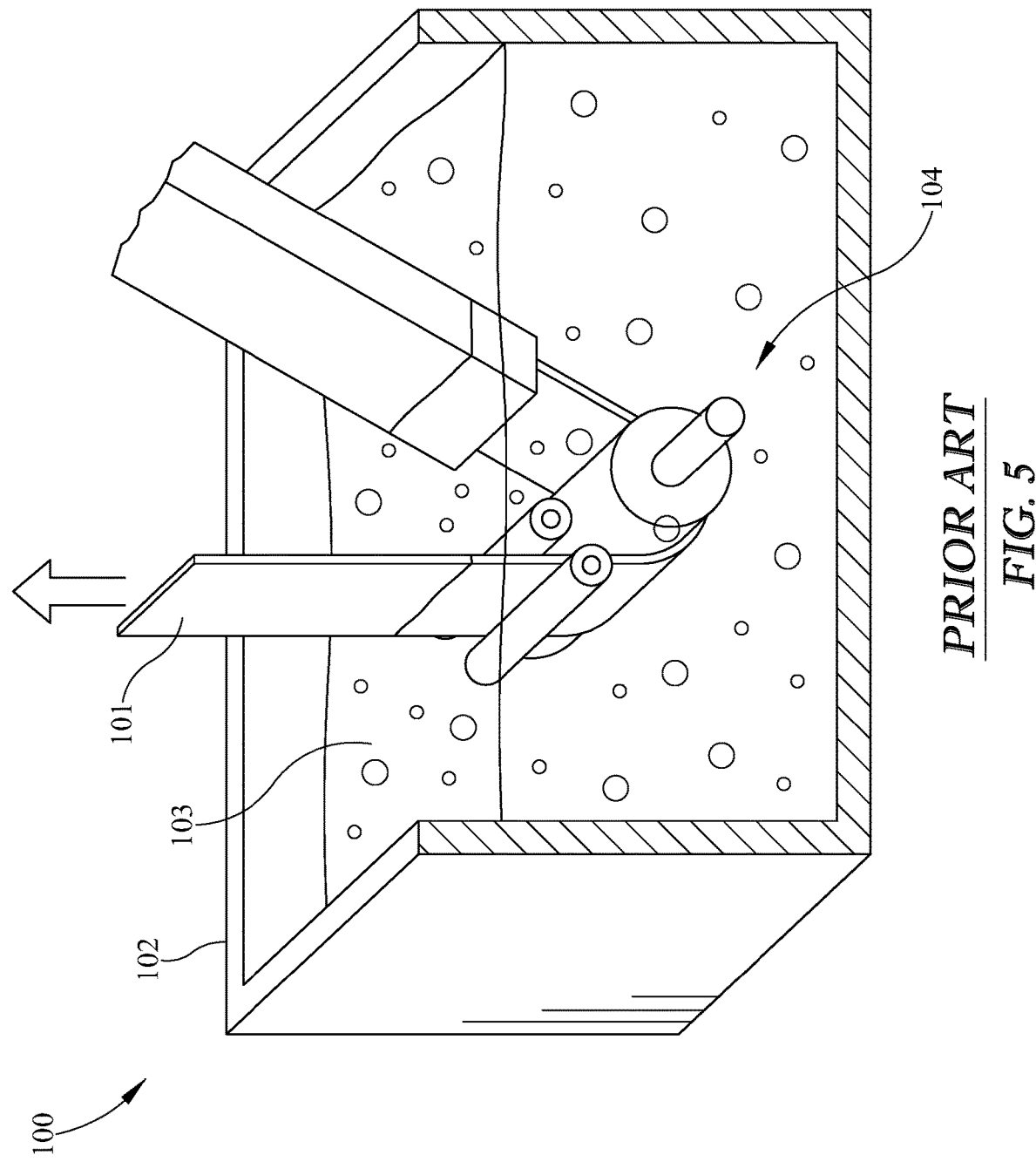
FIG. 5 is a schematic view of a prior art zinc pot in a continuous galvanizing line.

In addition to accommodating rotation of the roll 20 around its longitudinal axis, the bearing system 10 of the present invention further allows for rotation of the roll 20 in a direction perpendicular to the longitudinal axis of the roll 20. Referring now to FIGS. 2-4, the arm 109 is connected to an exterior housing 54 which partially encloses the housing 40 of the bearing system 10 to form a ball joint which allows the housing 40 to rotate relative to the exterior housing 54 perpendicular to the longitudinal axis of the roll 20. In particular, the exterior housing 54 has a curved inner surface 56 and the housing 40 includes a curved exterior surface 48 configured to engage the curved inner surface 56 of the exterior housing 54. As previously mentioned, the gas line 107 is not connected to the arm 109. As such, the gas line 107 and the arm 109 can move, at least somewhat, independent of each other. Accordingly, the gas line 107 and the arm 109 can accommodate rotation of the housing 40 within the exterior housing 54 as well as lateral motion of the housing 40 relative to the exterior housing 54 along the longitudinal axis of the roll 20.

As discussed above, the bearing system 10 of the present invention prevents molten metal from entering the cavity 46 of the housing 40. The bearing system 10, and in particular the bearing 80 itself, will therefore experience significantly less wear, extending the operational life of the bearing system 10 of the present invention. As such, it is contemplated that, in some embodiments, the roll 20 used in conjunction with the bearing system 10 of the present invention includes a coating along the exterior surface of the main body 22 which further increases the operational life of the roll. For example, in some exemplary embodiments, a steel roll is subject to boriding, or boronizing, in order to improve at least one of the wear resistance, hardness, thermal stability, resistance to corrosion by acids, and/or reduced coefficient of friction. Of course, other coatings or treatments are also contemplated to extend the operational life of the bearing system and/or roll in order to reduce the frequency of equipment changes which reduces the time in which the galvanizing line assembly is not operational. For example, in some exemplary embodiments, the roll is provided with a coating including, but not limited, to one or more of the follow: tungsten carbide, chrome carbide, WC—WB—Co, Alumina Zircona, TAMoB25NC3, and the like.

Referring once again to FIG. 1 in particular, in some embodiments of the present invention, the bearing system 10 described above with respect to FIGS. 2-4, is used for each of two bearing assemblies 10a, 10b connected to either side of a roll 20 as part of a roll assembly 104. The roll assembly 104 of the present invention is configured to be submerged in a corrosive environment, such as molten metal. As such, the roll assembly 104 can be used, for example, in a metal coating line assembly, such as a galvanizing line assembly.

Although the above embodiments are described with respect to a galvanizing line assembly, it is contemplated that the present invention is also suitable for other metal coating system including, but not limited to, assemblies for the production of galvannealed steel, galvalum, and aluminized metals. Likewise, any application in which a bearing system is subjected to a corrosive environment would benefit from the bearing system of the present invention.

One of ordinary skill in the art will recognize that additional embodiments are possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A bearing system that accepts a journal of a roll, comprising:
   a housing defining a cavity and having a forward wall that defines an opening into the cavity, the opening configured to accept the journal through the opening and into the cavity;
   a sleeve positioned within the cavity of the housing, the sleeve configured to surround the end of the journal;
   a first seal positioned within the cavity of the housing adjacent to the forward wall of the housing, the first seal having an engagement surface; and
   a second seal positioned within the cavity of the housing and operably connected to the sleeve, the second seal having an engagement surface in contact with the engagement surface of the first seal;
   wherein the engagement surface of the first seal and the engagement surface of the second seal are sloped towards the forward wall of the housing.

2. The bearing system of claim 1, wherein the first seal surrounds the opening in the forward wall of the housing.

3. The bearing system of claim 1, wherein the second seal extends through the first seal.

4. The bearing system of claim 1, further comprising a spring positioned within the cavity of the housing, the spring configured to bias the engagement surface of the first seal in contact with the engagement surface of the second seal.

5. The bearing system of claim 1, wherein the housing further includes a removable rear cover plate that allows access to the cavity of the housing.

6. The bearing system of claim 1, wherein the cavity of the housing is pressurized such that the engagement surface of the first seal is kept in contact with the engagement surface of the second seal.

7. The bearing system of claim 6, wherein the cavity of the housing is pressurized with nitrogen.

8. The bearing system of claim 1 further comprising a gas line in fluid communication with the cavity of the housing, the gas line configured to selectively pressurize the cavity of the housing such that the engagement surface of the first seal is kept in contact with the engagement surface of the second seal.

9. The bearing system of claim 8, further comprising a spring positioned within the cavity of the housing, the spring configured to bias the engagement surface of the first seal in contact with the engagement surface of the second seal when the cavity of the housing is not pressurized.

10. The bearing system of claim 1, wherein the coefficient of thermal expansion of the sleeve is less than the coefficient of thermal expansion of the journal, such that the sleeve locks onto the journal when the journal is heated and releases when the journal is cooled.

11. A bearing system that accepts a journal of a roll, comprising:
    a housing defining a cavity and having a forward wall that defines an opening into the cavity, the opening configured to accept the journal through the opening and into the cavity;
    a sleeve positioned within the cavity of the housing, the sleeve configured to surround the end of the journal;
    a first seal positioned within the cavity of the housing adjacent to the forward wall of the housing, the first seal having an engagement surface;
    a second seal positioned within the cavity of the housing and operably connected to the sleeve, the second seal having an engagement surface in contact with the engagement surface of the first seal; and
    a rolling bearing positioned around the sleeve and in contact with the housing.

12. A bearing system that accepts a journal of a roll, comprising:
    a housing defining a cavity and having a forward wall that defines an opening into the cavity, the opening configured to accept the journal through the opening and into the cavity;
    a sleeve positioned within the cavity of the housing, the sleeve configured to surround the end of the journal;
    a first seal positioned within the cavity of the housing adjacent to the forward wall of the housing, the first seal having an engagement surface;
    a second seal positioned within the cavity of the housing and operably connected to the sleeve, the second seal having an engagement surface in contact with the engagement surface of the first seal; and
    an exterior housing having a curved inner surface, wherein the housing has a curved exterior surface configured to engage the curved inner surface of the exterior housing such that the housing can rotate relative to the exterior housing perpendicular to the longitudinal axis of the roll.

13. A roll assembly, comprising:
    a first arm;
    a first gas line;
    a second arm;
    a second gas line;
    a first bearing assembly positioned at the end of the first arm, the first bearing assembly including
       a housing defining a cavity and having a forward wall that defines an opening into the cavity, the housing having a curved exterior surface,
       a sleeve positioned within the cavity of the housing, a first seal positioned within the cavity of the housing adjacent to the forward wall of the housing, the first seal having an engagement surface, and a second seal positioned within the cavity of the housing and operably connected to the sleeve, the second seal having an engagement surface in contact with the engagement surface of the first seal;

a second bearing assembly positioned at the end of the second arm, the second bearing assembly including a housing defining a cavity and having a forward wall that defines an opening into the cavity, the housing having a curved exterior surface, a sleeve positioned within the cavity of the housing, a first seal positioned within the cavity of the housing adjacent to the forward wall of the housing, the first seal having an engagement surface, and a second seal positioned within the cavity of the housing and operably connected to the sleeve, the second seal having an engagement surface in contact with the engagement surface of the first seal; and a roll including a main body, a first journal positioned at an end of the main body, and a second journal positioned at another end of the main body opposite the first journal, the first journal configured to pass through the opening into the cavity of the housing of the first bearing assembly and engage the sleeve of the first bearing assembly, the second journal configured to pass through the opening into the cavity of the housing of the second bearing assembly and engage the sleeve of the second bearing assembly;

wherein the first gas line pressurizes the cavity of the housing of the first bearing assembly such that the engagement surface of the second seal is kept in contact with the engagement surface of the first seal;

wherein the second gas line pressurize the cavity of the housing of the second bearing assembly such that the engagement surface of the second seal is kept in contact with the engagement surface of the first seal;

wherein the first arm includes an exterior housing having a curved inner surface which partially encloses the housing of the first bearing assembly, and the curved exterior surface of the housing of the first bearing assembly is configured to engage the curved inner surface such that the housing can rotate relative to the exterior housing perpendicular to the longitudinal axis of the roll; and wherein the second arm includes an exterior housing having a curved inner surface which partially encloses the housing of the second bearing assembly such that the housing can rotate relative to the exterior housing perpendicular to the longitudinal axis of the roll.

14. A metal coating line assembly, comprising:
a hot dipping bath filled with a molten metal;
a roll having a journal at each end of the roll;
a first bearing assembly including
a housing defining a cavity and having a forward wall that defines an opening into the cavity, the opening configured to accept one of the journals through the opening and into the cavity, a sleeve positioned within the cavity of the housing, the sleeve configured to surround the end of the one journal, a first seal positioned within the cavity of the housing adjacent to the forward wall of the housing, the first seal having an engagement surface, a second seal positioned within the cavity of the housing and operably connected to the sleeve, the second seal having an engagement surface in contact with the engagement surface of the first seal, and a rolling bearing positioned around the sleeve and in contact with the housing; and a second bearing assembly including
a housing defining a cavity and having a forward wall that defines an opening into the cavity, the opening configured to accept the other of the journals through the opening and into the cavity, a sleeve positioned within the cavity of the housing, the sleeve configured to surround the end of the other journal, a first seal positioned within the cavity of the housing adjacent to the forward wall of the housing, the first seal having an engagement surface, a second seal positioned within the cavity of the housing and operably connected to the sleeve, the second seal having an engagement surface in contact with the engagement surface of the first seal, and a rolling bearing positioned around the sleeve and in contact with the housing;

wherein roll, the first bearing assembly, and the second bearing assembly are submerged within the molten metal.

15. The bearing system of claim 14, wherein for each of the bearing assemblies, the cavity of the housing is pressurized such that the engagement surface of the first seal is kept in contact with the engagement surface of the second seal.

* * * * *